US008291479B2

(12) United States Patent
Betzler et al.

(10) Patent No.: US 8,291,479 B2
(45) Date of Patent: Oct. 16, 2012

(54) METHOD, HARDWARE PRODUCT, AND COMPUTER PROGRAM PRODUCT FOR OPTIMIZING SECURITY IN THE CONTEXT OF CREDENTIAL TRANSFORMATION SERVICES

(75) Inventors: Boas Betzler, Magstadt (DE); Ramamohan Chennamsetty, Highland, NY (US); Jeffrey A. Frey, New Paltz, NY (US); Michael D. Williams, Gardiner, NY (US)

(73) Assignee: International Business Machines Corporation, Armonk, NY (US)

( * ) Notice: Subject to any disclaimer, the term of this patent is extended or adjusted under 35 U.S.C. 154(b) by 785 days.

(21) Appl. No.: 12/269,343

(22) Filed: Nov. 12, 2008

(65) Prior Publication Data

US 2010/0122328 A1   May 13, 2010

(51) Int. Cl.
*G06F 15/16* (2006.01)

(52) U.S. Cl. .................. 726/6; 726/1; 726/18; 713/155; 713/172

(58) Field of Classification Search .................. 726/5, 6, 726/1, 18, 19; 713/155, 159, 168, 172; 709/223; 707/999.002
See application file for complete search history.

(56) References Cited

U.S. PATENT DOCUMENTS

| | | | |
|---|---|---|---|
| 5,878,431 A | 3/1999 | Potterveld et al. | |
| 6,154,767 A | 11/2000 | Altschuler et al. | |
| 6,477,645 B1 | 11/2002 | Drews | |
| 6,578,086 B1 | 6/2003 | Regan et al. | |
| 6,738,819 B1 | 5/2004 | Li et al. | |
| 6,901,446 B2 | 5/2005 | Chellis et al. | |
| 7,165,118 B2 | 1/2007 | Ballinger et al. | |
| 7,200,530 B2 | 4/2007 | Brown et al. | |
| 7,610,386 B1 | 10/2009 | Martinez et al. | |
| 7,698,398 B1 | 4/2010 | Lai | |
| 2003/0055945 A1 | 3/2003 | Bear et al. | |
| 2004/0024877 A1 | 2/2004 | Celle | |
| 2004/0230943 A1 | 11/2004 | Pourheidari et al. | |

(Continued)

FOREIGN PATENT DOCUMENTS

CN    1691622 A    11/2005

OTHER PUBLICATIONS

Robert C. Chalmer and Kevin C. Almeroth, "On the Topology of Multicast Trees", IEEE/ACM Transactions on Networking (TON), vol. 11, Issue 1; Feb. 2003, pp. 153-165.

(Continued)

*Primary Examiner* — Edward Zee
*Assistant Examiner* — Baotran N To
(74) *Attorney, Agent, or Firm* — Cantor Colburn LLP; William A. Kinnaman, Jr.

(57) ABSTRACT

Security is optimized in the context of a credential transformation service (CTS) by utilizing a web services client runtime to gather information for determining whether or not a target web service is hosted in a security domain used by a client application and for determining whether or not the target web service uses an authentication mechanism substantially identical to that used by the client application. The gathered information is carried in an endpoint reference (EPR) of the target web service. In response to the client receiving the EPR, the client applies an optimization process to eliminate a possible unnecessary invocation of the CTS, wherein the target web service is an authoritative manageable resource having minimal or no responsibility for providing its identity, and having minimal or no responsibility for advertising any creation and destruction lifecycle related events.

20 Claims, 5 Drawing Sheets

U.S. PATENT DOCUMENTS

| | | |
|---|---|---|
| 2004/0237094 A1 | 11/2004 | Vambenepe et al. |
| 2005/0132381 A1* | 6/2005 | Fiammante et al. .......... 719/310 |
| 2005/0222969 A1 | 10/2005 | Yip et al. |
| 2006/0026552 A1 | 2/2006 | Mazzitelli et al. |
| 2006/0047742 A1 | 3/2006 | O'Neill et al. |
| 2006/0048097 A1 | 3/2006 | Doshi |
| 2006/0092950 A1 | 5/2006 | Arregoces et al. |
| 2006/0123116 A1 | 6/2006 | Rahman et al. |
| 2006/0146991 A1 | 7/2006 | Thompson et al. |
| 2006/0212473 A1 | 9/2006 | Carusi et al. |
| 2006/0253420 A1 | 11/2006 | Hinton et al. |
| 2006/0277606 A1 | 12/2006 | Yunus et al. |
| 2006/0288071 A1 | 12/2006 | Bigioi et al. |
| 2007/0022154 A1 | 1/2007 | Saunders et al. |
| 2009/0089408 A1 | 4/2009 | Bou-Diab et al. |
| 2009/0228517 A1 | 9/2009 | Arwe et al. |
| 2010/0049833 A1 | 2/2010 | Matthews et al. |
| 2010/0131650 A1 | 5/2010 | Pok et al. |
| 2010/0235844 A1 | 9/2010 | Arwe et al. |
| 2010/0332490 A1 | 12/2010 | Bauer et al. |

OTHER PUBLICATIONS

Katia Obraczka and Grig Gheorghiu, "The Performance of a Service for Network-Aware Applications". Symposium on Parallel and Distributed Tools archive, Proceedings of the SIGMETRICS symposium on Parallel and distributed tools, Welches, Oregon, United States, pp. 81-91, 1998.

K. Taura, K. Kaneda, T. Endo, A. Yonezawa, "Phoenix: a Parallel Programming Model for Accomodating Dynamically Joining/Leaving Resources", Principles and Practice of Parallel Programming, San Diego, California, USA, pp. 216-229; 2003.

Lan Wu, "Service Discovery for Personal Networks" A Thesis Report, Presented to the INFOTECH Program of University of Stuttgart, pp. 1-100, Dec. 2004.

* cited by examiner

METHOD, HARDWARE PRODUCT, AND COMPUTER PROGRAM PRODUCT FOR OPTIMIZING SECURITY IN THE CONTEXT OF CREDENTIAL TRANSFORMATION SERVICES

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

1. Field of the Invention

This invention relates to the field of computer systems management and, in particular, to methods, systems, and computer program products for identifying and accessing information technology (IT) resources.

2. Description of Background

One of the important goals of resource virtualization is being able to access a variety of resources using a set of standard interfaces, irrespective of the different security domains to which these resources may belong. A security domain can be described as a domain which uses a single user registry and associated authentication mechanisms for authentication.

In many resource management scenarios, it is apparent that various resources may belong to any of a multiplicity of different security domains. Thus, there is a need for federating these security domains using credential transformation services for achieving end to end security. A web service known as the Virtualization Engine (VE) Foundation, an on demand resource management solution, introduces security services aimed at providing secure end to end interactions between the VE Foundation services and other web services deployed in a given environment. Specifically, these security capabilities are intended to enable secure interaction between the VE Foundation services and the manageable resources. In order to ensure secure interaction between services deployed in different security domains, the VE Foundation provides a credential transformation service that conforms to an interoperability standard known as WS-Trust. This credential transformation service (CTS) is called by a web services runtime as a normal part of client side interaction during invocation of one service from another.

Currently there are no mechanisms available for recognizing the notion of security domain during a web service call. For example, an endpoint reference (EPR) is security domain agnostic. In most cases, a source web service does not know where target web services are deployed, nor does the source web service know the identities of the security domains to which the target web services belong. Thus, utilization of CTS is required to determine the correct credential before the source web service can invoke the target web service. However, a call to CTS results in unnecessary performance degradation in situations where the source and target web services reside in the same security domain and where the source and target web service runtimes employ the same authentication mechanisms. In these situations, no credential transformation is required. Accordingly, what is needed is a technique for eliminating credential transformation in situations where such transformation is unnecessary and could possibly degrade performance.

SUMMARY

A method for optimizing security in the context of a credential transformation service (CTS) utilizes a web services client runtime to gather information for determining whether or not a target web service is hosted in a security domain used by a client application of a client and for determining whether or not the target web service uses an authentication mechanism substantially identical to that used by the client application. The gathered information is carried in an endpoint reference (EPR) of the target web service. In response to the client receiving the EPR, the client applies an optimization process to eliminate a possible unnecessary invocation of the CTS, wherein the target web service is an authoritative manageable resource having minimal or no responsibility for providing its identity, and having minimal or no responsibility for advertising any creation and destruction lifecycle related events. A services oriented architecture (SOA) is provided that defines one or more services needed to manage the authoritative manageable resource within a distributed and heterogeneous management system. A component model is provided that defines one or more interfaces and one or more interactions to be implemented by the manageable resource within the SOA.

Hardware products and computer program products corresponding to the above-summarized methods are also described and claimed herein. Other hardware products, methods, and/or computer program products according to embodiments will be or become apparent to one with skill in the art upon review of the following drawings and detailed description. It is intended that all such additional hardware products, methods, and/or computer program products be included within this description, be within the scope of the present invention, and be protected by the accompanying claims.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

As a preliminary matter, although various illustrative embodiments of the invention disclosed herein will be discussed in the exemplary context of Web Services Distributed Management (WSDM) and its dependent and related standards, this is for explanatory purposes. It should be noted that the embodiments of the invention disclosed herein are not limited strictly to a realization using Web services and WSDM. The ideas being described are much more general and could be manifested using many different technologies and standards. Thus, a greater emphasis should be placed on semantics definitions as opposed to specific syntax and protocol definitions used to realize the semantics.

Figure 1:
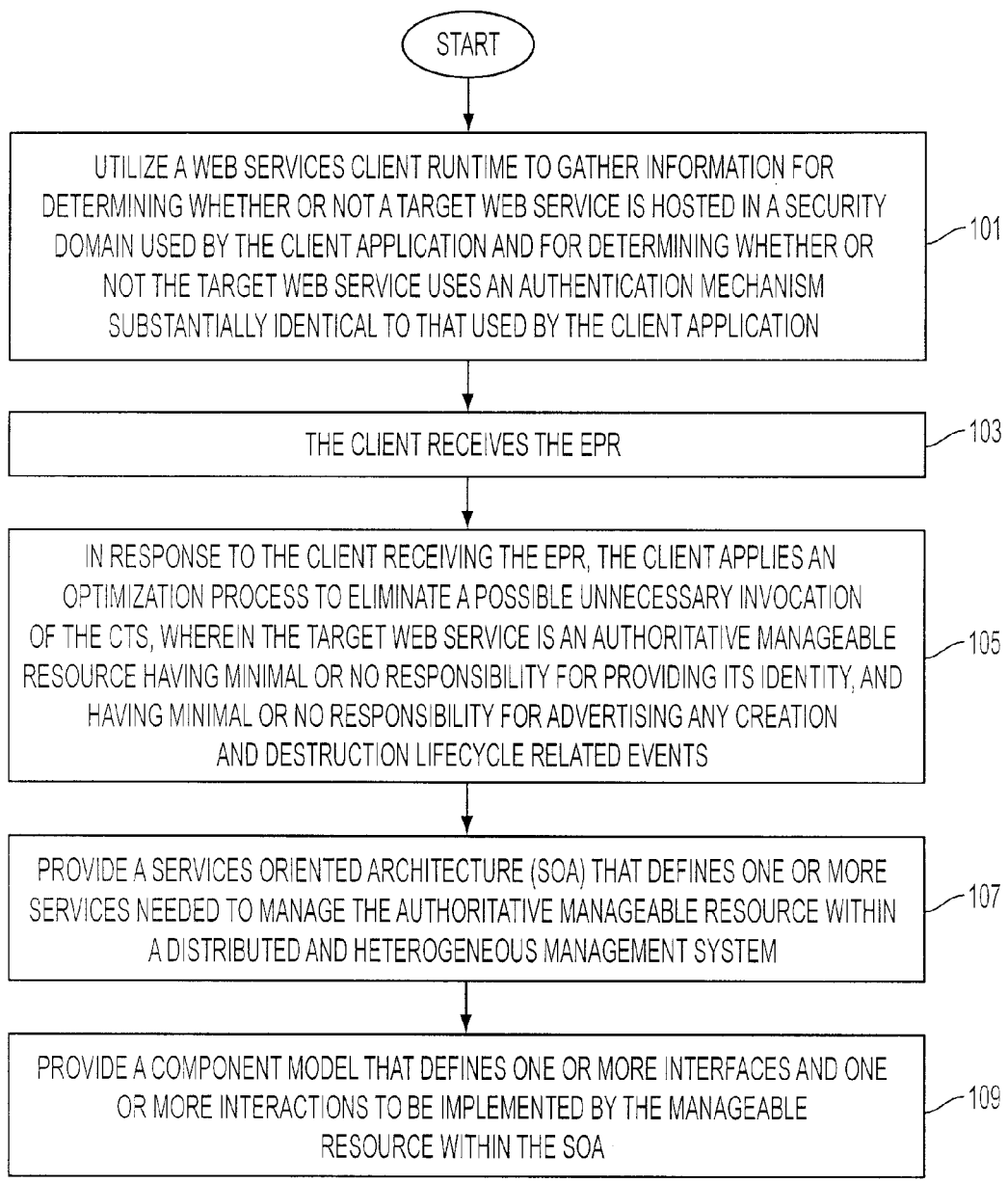
FIG. 1 is a flowchart setting forth an illustrative operational sequence for optimizing security in the context of a credential transformation service (CTS)

FIG. 1 is a flowchart setting forth an illustrative operational sequence for optimizing security in the context of a credential transformation service (CTS). The method commences at block 101 where a web services client runtime is utilized to gather information for determining whether or not a target web service is hosted in a security domain used by the client application and for determining whether or not the target web service uses an authentication mechanism substantially identical to that used by the client application. This information is carried in an endpoint reference (EPR) of the target web service. Illustratively, the EPR may, but need not, be a WS-Addressing EPR. At block 103, the client receives the EPR. Next, at block 105, in response to the client receiving the EPR, the client applies an optimization process to eliminate a possible unnecessary invocation of the CTS, wherein the target web service is an authoritative manageable resource having minimal or no responsibility for providing its identity, and having minimal or no responsibility for advertising any creation and destruction lifecycle related events.

The procedure of FIG. 1 advances to block 107 where a services oriented architecture (SOA) is provided that defines one or more services needed to manage the authoritative manageable resource within a distributed and heterogeneous management system. At block 109, a component model is provided that defines one or more interfaces and one or more interactions to be implemented by the manageable resource within the SOA. This method represents an evolutionary approach that allows for a staged migration of existing management tools and resources.

In many real world settings, web services may be implemented in the form of Virtualization Engine (VE) Foundation services. Each of these VE Foundation services are responsible for generating an EPR with the information described previously arranged in the following format:

```
<wsp:Policy>
    xmlns:wsp="http://schemas.xmlsoap.org/ws/2004/09/policy" >
xmlns:msfsd="http://www.ibm.com/xmlns/prod/ODOE/MS/Foundation/
SecurityDomain-1.0" >
    <wsp:ExactlyOne>
        <wsp:All>
            <msfsd:SecurityDomain> host:users.registry.ibmmsf
</msfsd:SecurityDomain>
                <msfsd:AuthMechanism> LTPA </msfsd:
                AuthMechanism >
```

The above snippet describes a mechanism to carry the information such as a security domain name, as well as an authentication mechanism that is supported by that domain in the format of a ws-policy. The ws-policy represents a standard way to describe web services policies. This information must be attached to all EPRs, and the attachment may be performed as part of EPR creation. Once the EPR is created with the foregoing information, the web services client runtime can introspect and determine the security domain. If the client detects that it is invoking a target service such that the EPR reference is deployed in the same security domain as the client, then client will not invoke the CTS, there by reducing unnecessary credential transformation. If the target service belongs to a different security domain than the client, then the CTS will be invoked for a credential transformation.

During installation, the VE Foundation is configured to a specific security domain with an appropriate authentication mechanism. Thus, all web services deployed in the VE Foundation belongs to this security domain. The domain name and authentication mechanism information is stored in a global configuration repository. A java helper class such as SecurityDomainEPRHelper can be used to obtain the domain specific information in a programmatic way. When an EPR is manufactured by a factory, the above mentioned helper class can be used to generate the domain specific information and insert this domain specific information into the EPR in the format described in the foregoing snippet. EPRs are typically persisted in a registry so that they can be discovered later.

Figure 2:
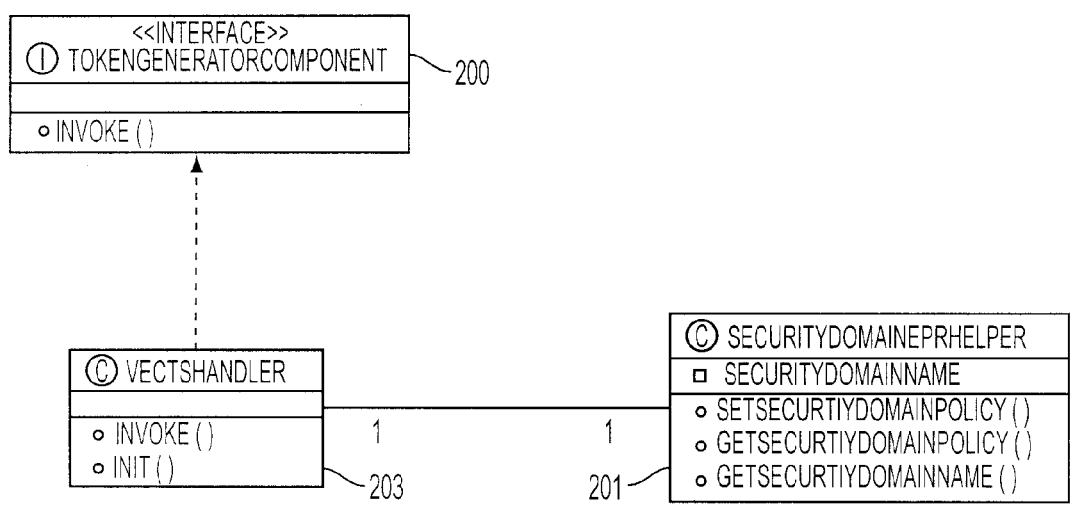
FIG. 2 is a class diagram of an illustrative security domain endpoint reference (EPR) helper class for use with the procedure of FIG. 1.

Refer now to FIG. 2 which illustrates a class diagram for a SecurityDomainEPRHelper 201 class for use with the procedure of FIG. 1. A plurality of web services clients in the VE foundation may be configured to use a runtime handler such as a JAX-RPC handler. Illustratively, the JAX-RPC handler may be implemented as a VECTSHandler 203 (FIG. 2). By configuring a handler for a web service client, a call may be intercepted for further processing before the call is dispatched to the target web service. For example, with the help of the SecurityDomainEPRHelper 201, the VECTSHandler 203 introspects the target EPR and determines whether this EPR belongs to same security domain as the client. Once the VECTSHandler 203 determines the security domain of the EPR, the VECTSHandler 203 makes a determination as to whether or not CTS should be invoked.

Figure 3:
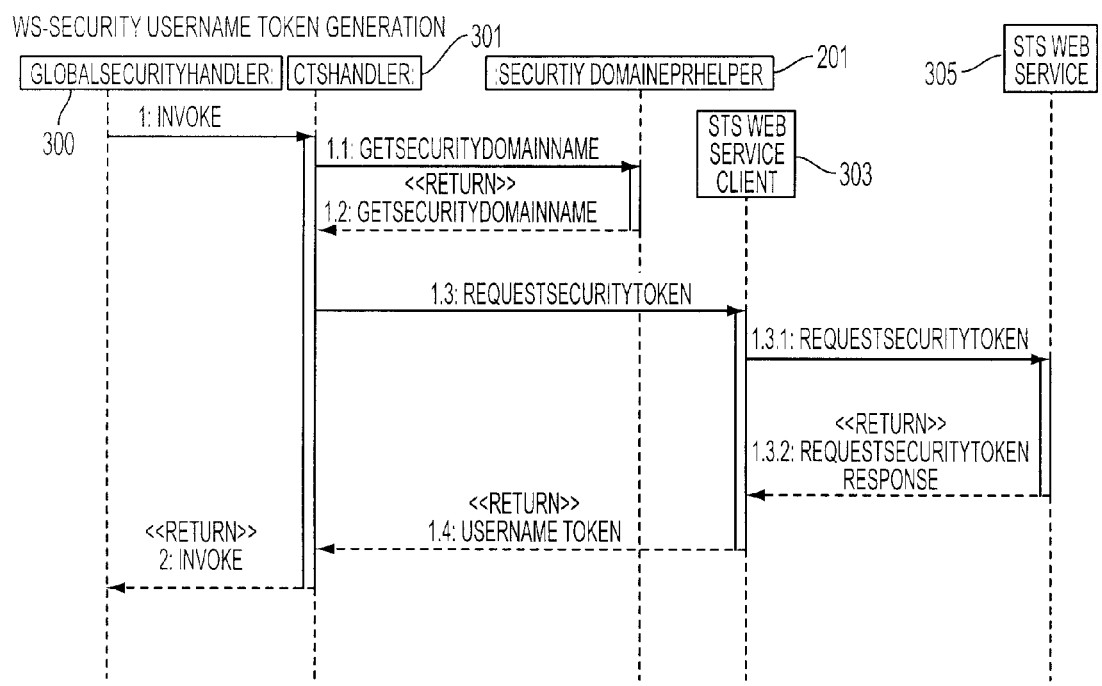
FIG. 3 is an information flow diagram showing an illustrative process for security username token generation.

FIG. 3 is an information flow diagram showing an illustrative process for security username token generation. A web services engine invokes a WebSphere GlobalSecurityHandler 300 to generate a secure message based on one or more security constraints configured for the web service. The GlobalSecurityHandler 300 invokes the VECTSHandler 203 (FIG. 2) to generate the appropriate security token. The VECTSHandler 203 determines the security domain of the target service. The VECTSHandler 203 calls the SecurityDomainEPRHelper 201 (FIGS. 2 and 3) to determine the security domain of the EPR. The VECTSHandler 203 (FIG. 2) compares the security domain information in the EPR with a GCR defined for a VE domain.

If the target service is outside the security domain, then a CTSHandler 301 (FIG. 3) invokes a STS Web service client 303 by passing a hostname, port number, and any other pertinent information (called claims) to obtain the appropriate security token for the target service. An STS Web service 305 processes the request, and the STS Web service 305 then returns the username security token for the target service.

Figure 4:
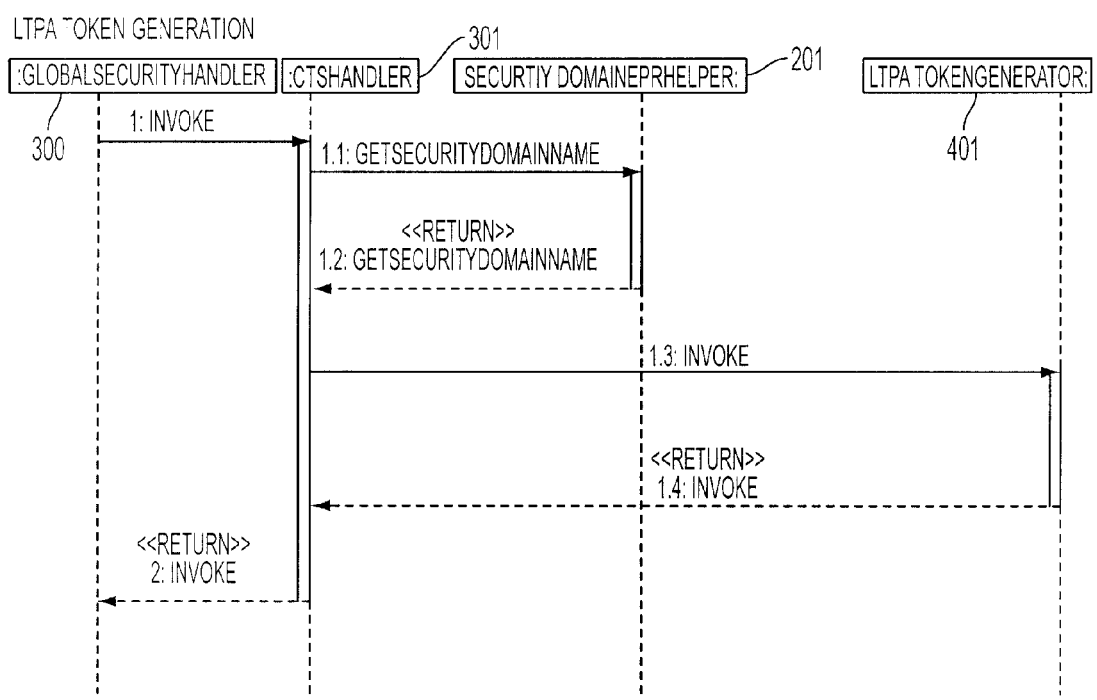
FIG. 4 is an information flow diagram showing an illustrative process for lightweight third party authentication (LTPA) token generation.

FIG. 4 is an information flow diagram showing an illustrative process for lightweight third party authentication (LTPA) token generation. LTPA is an authentication technology used in IBM WebSphere™, IBM Lotus Domino™, and other products as well. When accessing web servers that use the LTPA technology, it is possible for a web user to re-use his or her login across physical servers. A Lotus Domino™ server or an IBM WebSphere™ server that is configured to use the LTPA authentication will challenge the web user for a name and a password. When the user has been authenticated, his browser will have received a session cookie—a cookie that is only available for one browsing session. This cookie contains the LTPA token. If the user—after having received the LTPA token—accesses a server that is a member of the same authentication configuration as the first server, and if the browsing session has not been terminated (the browser was not closed down), then the user is automatically authenticated and will not be challenged for a name and password. Such an environment is also called a Single-Sign-On (SSO) environment.

If the target service is within the security domain, then the VECTSHandler 203 (FIG. 2) invokes an LTPATokenGenerator 401 (FIG. 4) to generate an LTPA token. The LTPAToken-Generator 401 processes a request from the CTSHandler 301 (FIGS. 3 and 4). The LTPATokenGenerator 401 (FIG. 4) returns an LTPA security token for the target service. The VECTSHandler 203 (FIG. 2) updates a SOAP MessageContext with the returned security token. The GlobalSecurityHandler 300 (FIGS. 3 and 4) then reads and parses a WS-Security configuration from a MessageContext and from the deployment descriptors to generate the security portion of a SOAP message. The SOAP message with security information is then sent to the target service.

Figure 5:
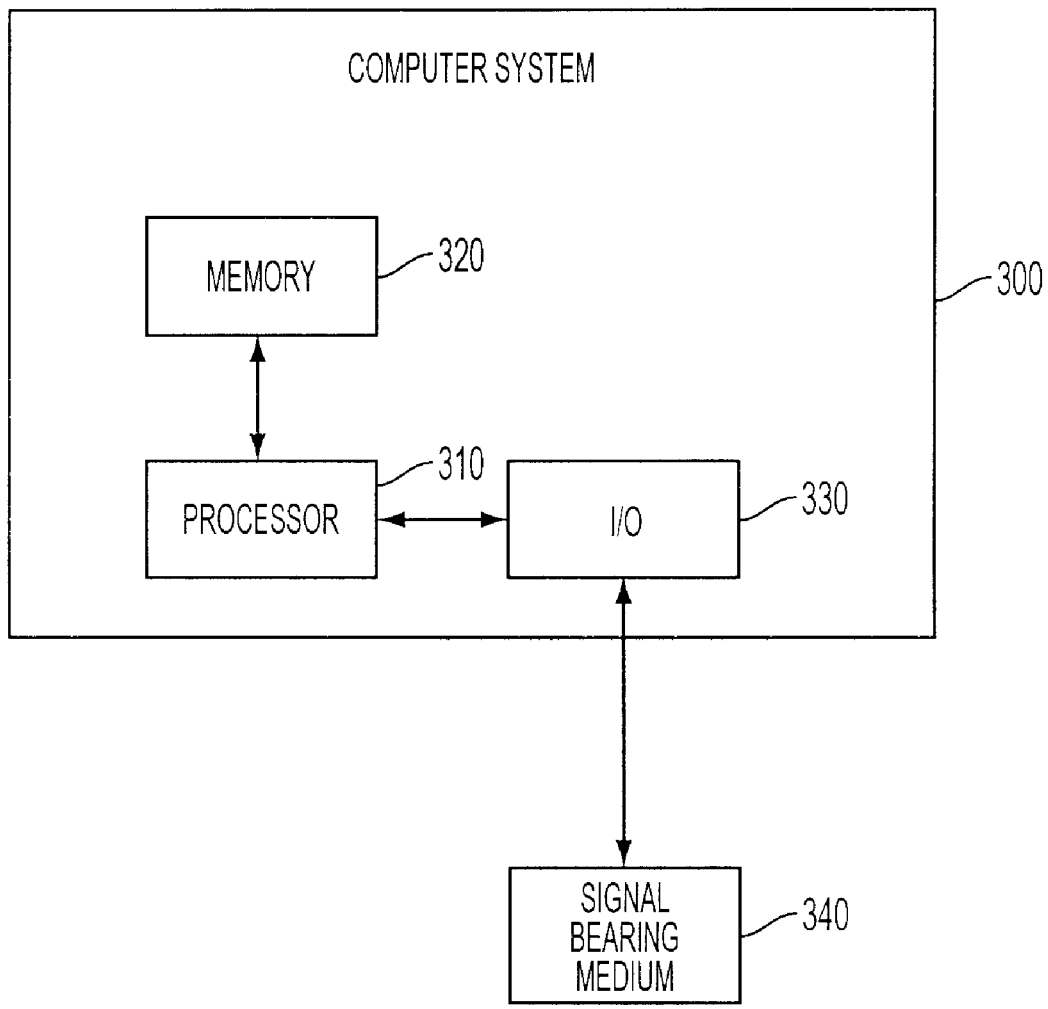
FIG. 5 sets forth an illustrative computer program product or hardware product for implementing an operational sequence for optimizing security in the context of a CTS.

FIG. 5 sets forth an illustrative computer program product or hardware product for implementing an operational sequence for optimizing security in the context of a CTS. The system includes a computer 300 operatively coupled to a signal bearing medium 340 via an input/output interface (I/O) 330. The signal bearing medium 340 may include a representation of instructions for implementing an enhanced decimal floating point unit that is capable of executing decimal fixed point operations, and may be implemented as, e.g., information permanently stored on non-writeable storage media (e.g., read-only memory devices within a computer, such as CD-ROM disks readable by a CD-ROM drive), alterable information stored on a writeable storage media (e.g., floppy disks within a diskette drive or hard disk drive), information conveyed to a computer by a communications medium, such as through a computer or telephone network, including wireless or broadband communications networks, such as the Internet, etc.

The computer 300 includes a processor 310 that processes information for implementing an operational sequence for optimizing security in the context of a CTS, wherein the information is represented, e.g., on the signal bearing medium 340 and communicated to the computer 300 via the I/O 330, wherein the processor 310 saves information as appropriate into a memory 320. This information may also be saved into the memory 320, e.g., via communication with the I/O 330 and the signal bearing medium 340.

The processor 310 executes a program for implementing an operational sequence for optimizing security in the context of a CTS. The processor 310 implements instructions for utilizing a web services client runtime to gather information for determining whether or not a target web service is hosted in a security domain used by a client application and for determining whether or not the target web service uses an authentication mechanism substantially identical to that used by the client application. This information is carried in an endpoint reference (EPR) of the target web service. In response to the client receiving the EPR, the client applies an optimization process to eliminate a possible unnecessary invocation of the CTS, wherein the target web service is an authoritative manageable resource having minimal or no responsibility for providing its identity, and having minimal or no responsibility for advertising any creation and destruction lifecycle related events. A services oriented architecture (SOA) is provided that defines one or more services needed to manage the authoritative manageable resource within a distributed and heterogeneous management system. A component model is provided that defines one or more interfaces and one or more interactions to be implemented by the manageable resource within the SOA. The foregoing steps may be implemented as a program or sequence of instructions within the memory 320, or on a signal bearing medium, such as the medium 340, and executed by the processor 310.

The capabilities of the present invention can be implemented in software, firmware, hardware or some combination thereof. As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately. Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention The foregoing exemplary embodiments may be provided in the form of computer-implemented processes and apparatuses for practicing those processes. The exemplary embodiments can also be provided in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be provided in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the exemplary embodiments. When implemented on a general-purpose microprocessor, the computer program code segments execute specific microprocessor machine instructions. The computer program code could be implemented using electronic logic circuits or a microchip.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A computer-executable method for optimizing security in a context of a credential transformation service (CTS), the method comprising:

utilizing a web services client runtime to gather information for determining whether or not a target web service is hosted in a security domain used by a client application of a client computer and for determining whether or not the target web service uses an authentication mechanism substantially identical to that used by the client application, wherein the gathered information is carried in an endpoint reference (EPR) of the target web service;

in response to the client computer receiving the EPR, the client computer applying an optimization process to eliminate a possible unnecessary invocation of the CTS, wherein the target web service is an authoritative manageable resource having minimal or no responsibility for providing identity of the authoritative manageable resource, and having minimal or no responsibility for advertising any creation and destruction lifecycle related events;

providing a services oriented architecture (SOA) that defines one or more services needed to manage the authoritative manageable resource within a distributed and heterogeneous management system;

providing a component model that defines one or more interfaces and one or more interactions to be implemented by the authoritative manageable resource within the SOA; and wherein the optimization process is based on the gathered information carried in the EPR.

2. The method of claim 1 wherein the EPR is a web service (WS)-Addressing EPR.

3. The method of claim 1 wherein the target web service is implemented as a Virtualization Engine (VE) Foundation service.

4. The method of claim 1 wherein the gathered information comprises a security domain name.

5. The method of claim 4 wherein the gathered information identifies an authentication mechanism that is supported by the security domain name.

6. The method of claim 5 wherein the gathered information is arranged as a web services (ws)-policy that is attached to the EPR.

7. The method of claim 6 wherein the web services (ws)-policy is attached to the EPR when the EPR is created.

8. A computer program product comprising a non-transitory computer readable storage medium readable by a processing circuit and storing instructions for execution by the processing circuit for facilitating a method for optimizing security in a context of a credential transformation service (CTS), the method comprising:

utilizing a web services client runtime to gather information for determining whether or not a target web service is hosted in a security domain used by a client application of a client computer and for determining whether or not the target web service uses an authentication mechanism substantially identical to that used by the client application, wherein the gathered information is carried in an endpoint reference (EPR) of the target web service;

in response to the client computer receiving the EPR, the client computer applying an optimization process to eliminate a possible unnecessary invocation of the CTS, wherein the target web service is an authoritative manageable resource having minimal or no responsibility for providing identity of the authoritative manageable resource, and having minimal or no responsibility for advertising any creation and destruction lifecycle related events;

providing a services oriented architecture (SOA) that defines one or more services needed to manage the authoritative manageable resource within a distributed and heterogeneous management system;

providing a component model that defines one or more interfaces and one or more interactions to be implemented by the authoritative manageable resource within the SOA; and wherein the optimization process is based on the gathered information carried in the EPR.

9. The computer program product of claim 8 wherein the EPR is a web service (ws)-Addressing EPR.

10. The computer program product of claim 8 wherein the target web service is implemented as a Virtualization Engine (VE) Foundation service.

11. The computer program product of claim 8 wherein the gathered information comprises a security domain name.

12. The computer program product of claim 11 wherein the gathered information identifies an authentication mechanism that is supported by the security domain name.

13. The computer program product of claim 12 wherein the gathered information is arranged as a web services (ws)-policy that is attached to the EPR.

14. The computer program product of claim 13 wherein the attaching web services (ws)-policy is attached to the EPR when the EPR is created.

15. A hardware product comprising a non-transitory computer readable storage medium readable by a processing circuit and storing instructions for execution by the processing circuit for facilitating a method for optimizing security in a context of a credential transformation service (CTS), the method comprising:

utilizing a web services client runtime to gather information for determining whether or not a target web service is hosted in a security domain used by a client application of a client computer and for determining whether or not the target web service uses an authentication mechanism substantially identical to that used by the client application, wherein the gathered information is carried in an endpoint reference (EPR) of the target web service;

in response to the client computer receiving the EPR, the client computer applying an optimization process to eliminate a possible unnecessary invocation of the CTS, wherein the target web service is an authoritative manageable resource having minimal or no responsibility for providing identity of the authoritative manageable resource, and having minimal or no responsibility for advertising any creation and destruction lifecycle related events;

providing a services oriented architecture (SOA) that defines one or more services needed to manage the authoritative manageable resource within a distributed and heterogeneous management system;

providing a component model that defines one or more interfaces and one or more interactions to be implemented by the authoritative manageable resource within the SOA; and wherein the optimization process is based on the gathered information carried in the EPR.

16. The hardware product of claim 15 wherein the EPR is a web service (ws)-Addressing EPR.

17. The hardware product of claim 15 wherein the target web service is implemented as a Virtualization Engine (VE) Foundation service.

18. The hardware product of claim 15 wherein the gathered information comprises a security domain name.

19. The hardware product of claim 18 wherein the gathered information identifies an authentication mechanism that is supported by the security domain name.

20. The computer program product of claim 19 wherein the gathered information is arranged as a web services (ws)-policy that is attached to the EPR when the EPR is created.

* * * * *